United States Patent [19]
Roy

[11] Patent Number: 5,529,221
[45] Date of Patent: Jun. 25, 1996

[54] METERED SERVING DISPENSER OF GRANULAR MATERIALS

[76] Inventor: Harold Van Roy, 3414 Putter Pl., Oceanside, Calif. 92056

[21] Appl. No.: 507,000

[22] Filed: Jul. 31, 1995

Related U.S. Application Data

[63] Continuation-in-part of Ser. No. 243,213, May 16, 1994, abandoned.

[51] Int. Cl.⁶ ..................................................... B67D 5/06
[52] U.S. Cl. ........................................ 222/181.2; 222/427
[58] Field of Search ............................. 222/181.2, 185.1, 222/427–430, 452, 370; 248/126, 645

[56] References Cited

U.S. PATENT DOCUMENTS

| | | | |
|---|---|---|---|
| 1,203,117 | 10/1916 | Jacovatos | 222/427 |
| 1,617,922 | 2/1927 | Morrison | 222/452 |
| 2,211,452 | 8/1940 | Bowman | 222/452 |
| 2,944,707 | 7/1960 | Steinmetz | 222/370 |
| 3,211,334 | 10/1965 | McShea | 222/181 |
| 4,257,538 | 3/1981 | Fowler | 248/126 |
| 5,271,535 | 12/1993 | Fridman et al. | 222/427 |

Primary Examiner—Andres Kashnikow
Assistant Examiner—Philippe Derakshani
Attorney, Agent, or Firm—John J. Murphey; Murphey Law Offices

[57] ABSTRACT

A metered serving dispenser of cup-strength quantitites of granular material, having few parts, that may be erected as a free-standing device, or hung from an overhanging surface or mounted on a vertical surface, such as a wall, to dispense dried powders and granulated foods into a container, such as a cup, for mixing with water for ingestion.

20 Claims, 6 Drawing Sheets

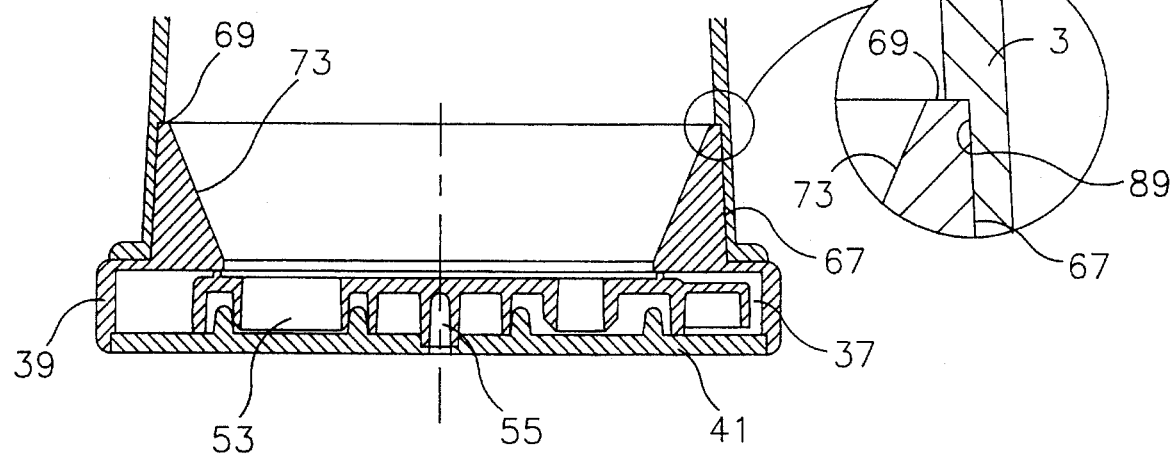
FIG. 5
FIG. 5A
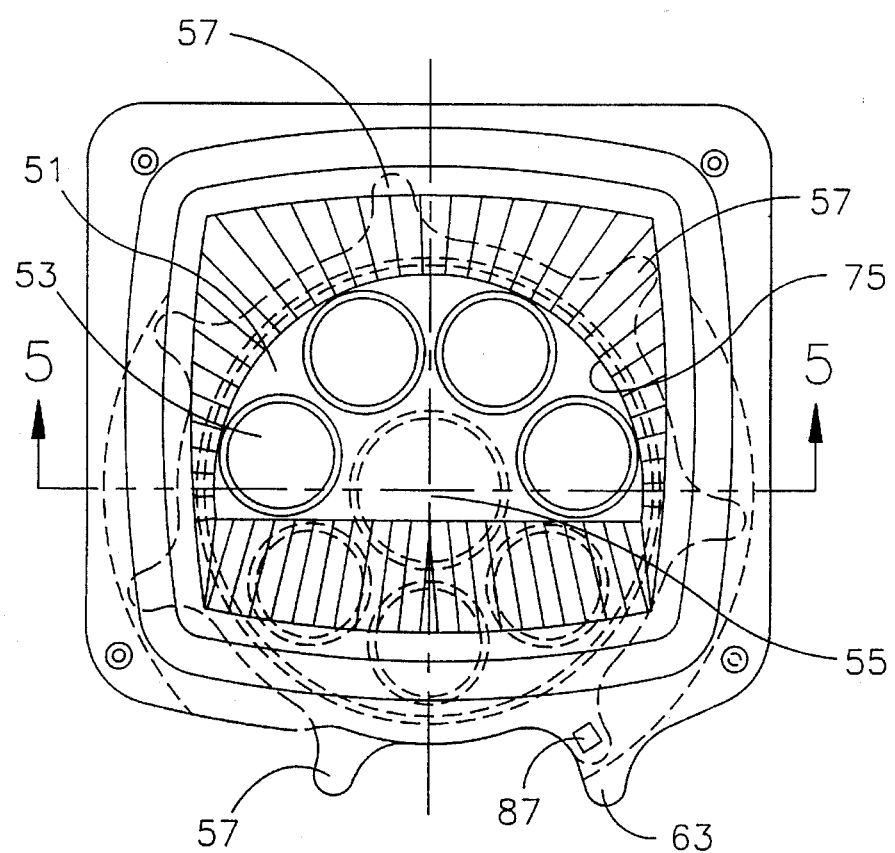
FIG. 6

METERED SERVING DISPENSER OF GRANULAR MATERIALS

This is a continuation-in-part of U.S. Ser. No. 08/243,213, now abandoned titled METERED SERVING DISPENSER, carrying a filing date of May 16, 1994.

BACKGROUND OF THE INVENTION

1. Field of the Invention

This invention pertains to the field of dried powders and granulated foods and other powders and granulated substances suitable for home and commercial use. More particularly, this invention pertains to a ruggedly constructed dispenser, having few parts, that may be erected as a free-standing device, or hung from an overhanging surface or mounted on a vertical surface, such as a wall, to dispense these dried powders and granulated foods into a container, such as a cup, for mixing with water for ingestion.

2. Description of the Prior Art

Society has progressed beyond making cups of coffee, tea and the like, by spooning the granular material from a bottle or tin. Today, there are coffee bags, coffee pouches, tea bags that can be dipped in a cup of hot water or placed in a pot through which hot water is passed to make the requisite brew. There are those, however, who desire to make their drink from instantly dissolvable granules such as instant coffee. The prior art contains certain types of dispensers for metering small quantities of these instantly dissolvable granules into a cup or other container for later drinking. For instance, U.S. Pat. No. 2,211,452 to Bowman discloses a gravity fed dispensing device comprising disks, scrapers, stationary members, as well as a container and container lid. U.S. Pat. No. 3,211,334 to McShea discloses another gravity fed dispensing device containing more disks, as well as a center mount and other parts.

These prior art devices suffer from some basic flaws. First they are comprised of many parts which makes their manufacturing costs unreasonably high. Secondly, their construction is complex including many springs, nuts, bolts, washers and the like making assembly, cleaning and reassembly time-consuming and generally difficult. Thirdly, the design of the individual parts does not lend themselves to easy molding so that fabrication is difficult. Finally, there is no reasonable method of adjusting the size of the portion of granular material dispensed except to double or triple the serving and either discard some granular material or return it to the container, the latter requiring the whole dispenser be unmounted, disassembled, then reassembled, etc.

Accordingly, there is a definite need for a granular material dispenser comprised of few parts, of rugged and simple construction, that is ,easily used as well as disassembled for cleaning and reassembly, and that has the ability to be altered to change the size of the dispensing portion of granular material.

SUMMARY OF THE INVENTION

This invention is a metered serving dispenser of granular and powdered material that satisfies all of the above-mentioned problems. It is of rugged design, contains very few parts, and does not require bolts, springs, washers, etc. that are found in the prior art. It is easy to disassemble, clean and reassemble because each part works in cooperation with the other parts without mounting hardware. The size of the portions may be easily and quickly changed so that the size of the dispensed material charge can be easily and closely controlled. The invention comprises a granular material container including contiguous container walls and having a large, open end surrounded by an outwardly extending flat surface forming a flange, a horizontally arranged dispenser housing including a upwardly-facing flat, support surface, for receipt of the container flange in sealing engagement therewith, a support including a C-shaped, curved member for sliding engagement over a portion of the container flange and dispenser housing support surface, when in mutual sealed engagement, for retaining them in sandwich-like sealed engagement, and further including means extending from the curved member for maintaining the dispenser in either a free-standing configuration, or for mounting the dispenser housing under an overhanging surface, or for mounting the dispenser housing against a vertical surface, the housing having formed therein a shallow, disk-shaped chamber bounded by a curved descending perimeter wall and a chamber closure plate mounted to the housing, below the chamber, the plate having a drop hole formed therein, opening from the chamber to below the housing, a disk-shaped element removably retained in the chamber, for rotative movement therein, and having a plurality of vertically disposed measuring and dispensing apertures formed therethrough and arranged in a circle concentric with the disk-shaped element, a plurality of short levers extending outward from the disk-shaped element into the chamber for manipulation, one at a time, through a slot formed in the descending perimeter wall, for advancing one of the measuring and dispensing apertures into registration with the drop hole, and a feeder extending upwards centrally from the housing comprising an upwardly extending outer wall terminating at a rim spaced above the housing, the wall arranged to mate in sealing contact with the inner surface of the container adjacent the flange and a funnel-shaped inner wall, slanting downwardly and inwardly from the rim to form an opening through the housing into the chamber, to direct the granular material from the interior of the container into the measuring and dispensing apertures in the disk-shaped element and wherein a portion of the inner wall extends over the metering and dispensing element and terminates slightly above the element to level the granular material to the top of the dispensing aperture before the aperture is rotated into registration with the drop aperture.

In addition, other facets of the invention include the use of a square cross-section transparent container; a support including a C-shaped, curved member that extends around three sides of the support housing to hold the container and the dispenser housing in close, sealed contact; wherein the disk-shaped element is removable and replaceable by another disk-shaped element having different sized vertically disposed measuring and dispensing apertures formed therein;wherein the drop hole is located at the front of the housing to allow granular material to be dropped into a cup or other container at the front of the housing; and, a means for engaging the levers during their translation to provide an audible click indicating the dispensing operation has been complete; and, a cover pivotly held in place against the bottom of the drop hole to maintain the hole free of entry of dust, moisture, insects or other pests.

These and other objects of the invention will become more apparent upon reading the following description of the preferred embodiment taken together with the drawings appended hereto. The scope of protection sought by the inventor may be gleaned from a fair reading of the claims that conclude this specification.

DESCRIPTION OF THE DRAWINGS

FIG. 4A is an exploded view of a small portion thereof showing the means for obtaining an audible noise during the dispensing operation and for providing a restraint against reverse motion of the disk;

FIG. 5 is an enlarged sectional side view taken along lines 5—5 of FIG. 6 and wherein FIG. 5a is an exploded view of a small portion thereof;

FIG. 6 is a top sectional view of the upper portion of the dispenser housing taken along lines 6—6 in FIG. 1; and, FIG. 7 is a bottom perspective view of the invention showing the automatically closing cover over the drop hole.

DESCRIPTION OF THE PREFERRED EMBODIMENT

Figure 1:
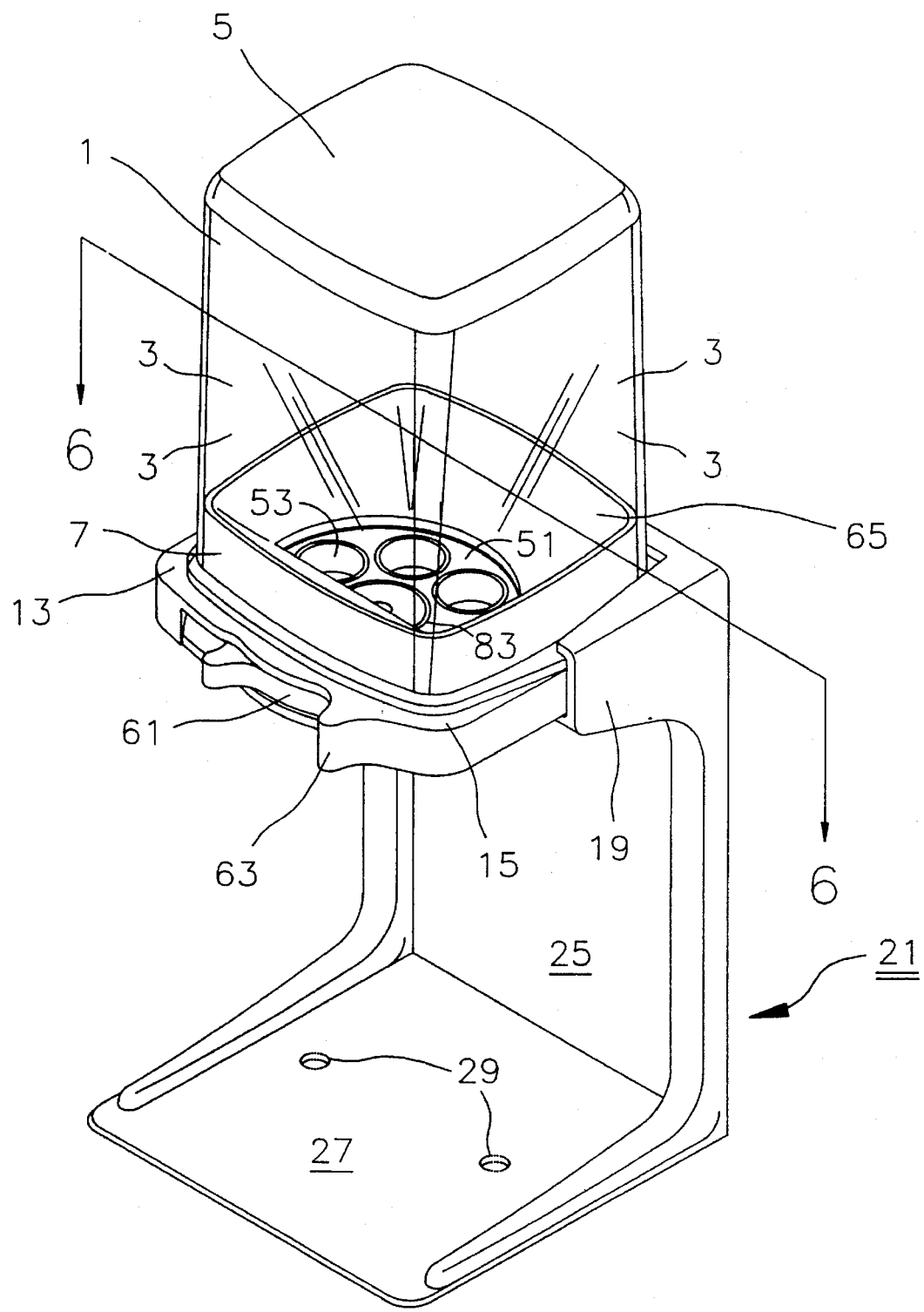
FIG. 1 is a top perspective view of the preferred embodiment of this invention shown in a free-standing position.
Figure 2:
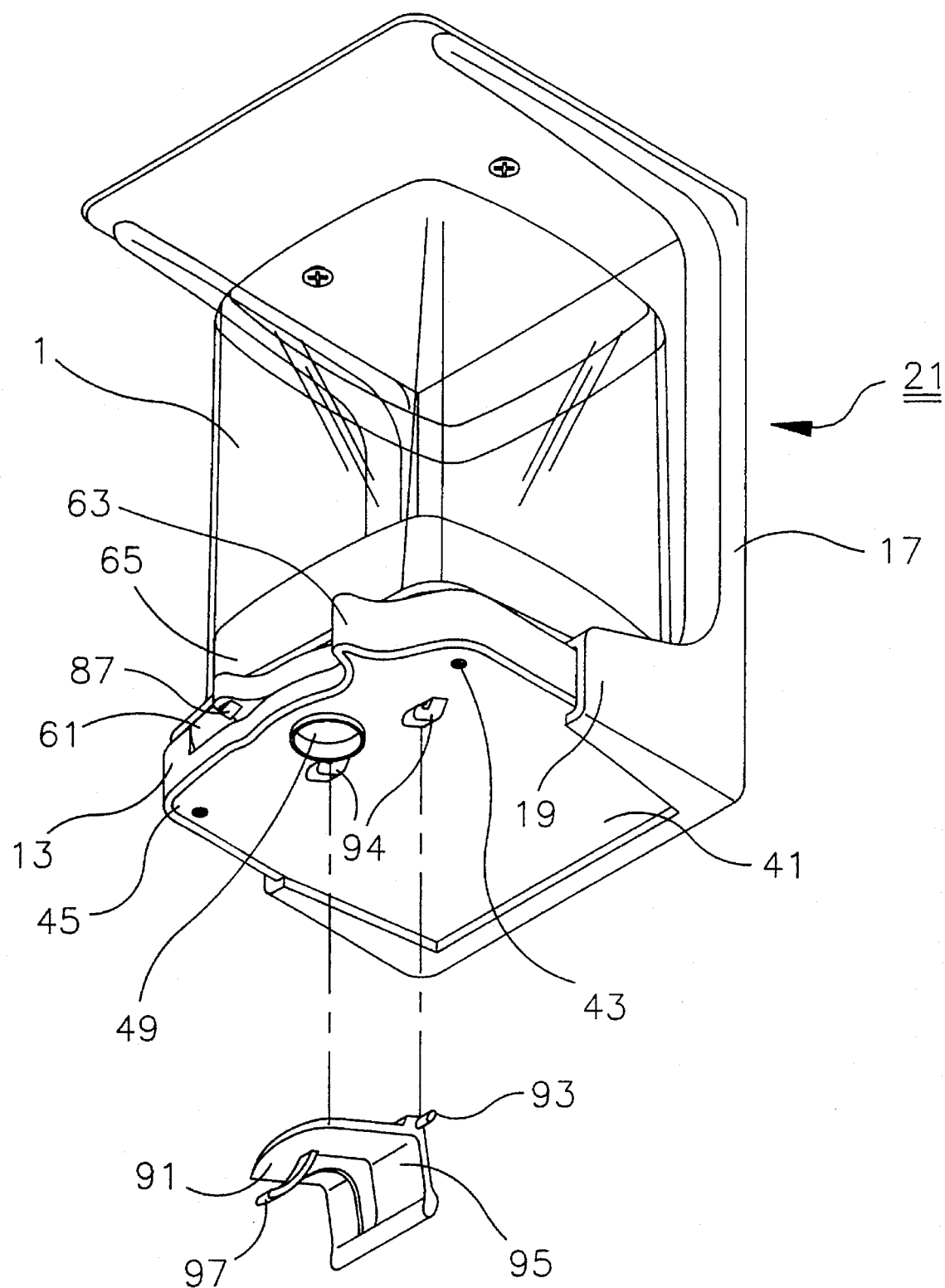
FIG. 2 is a bottom perspective view of the same embodiment shown in FIG. 1 wherein the support means has been rearranged to show the dispenser mounted for hanging underneath an overhanging surface and having a moveable cover underneath the unit.
Figure 3:
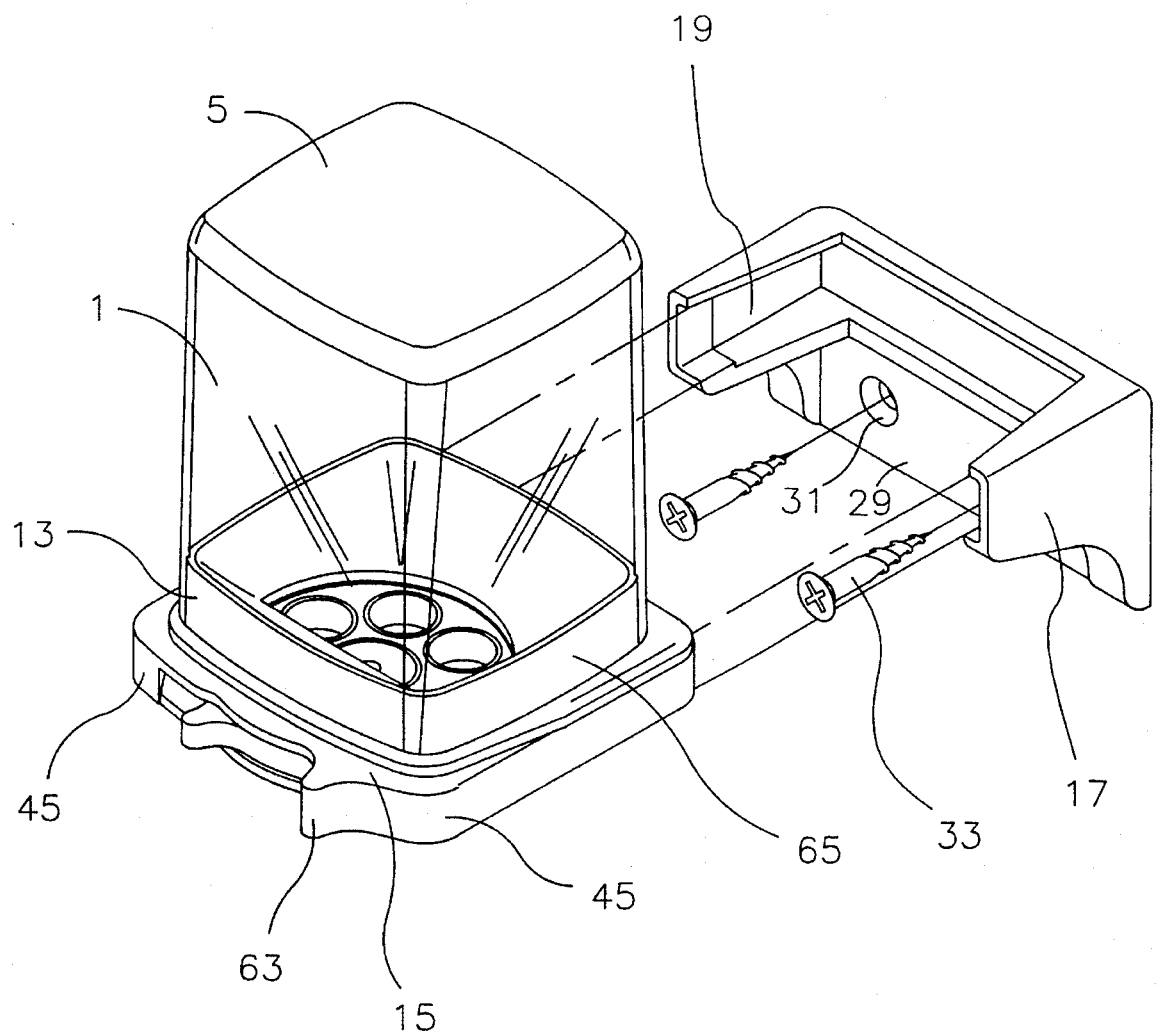
FIG. 3 is a top perspective view of the preferred embodiment of this invention showing the support means modified to allow mounting against the vertical surface.
Figure 4:
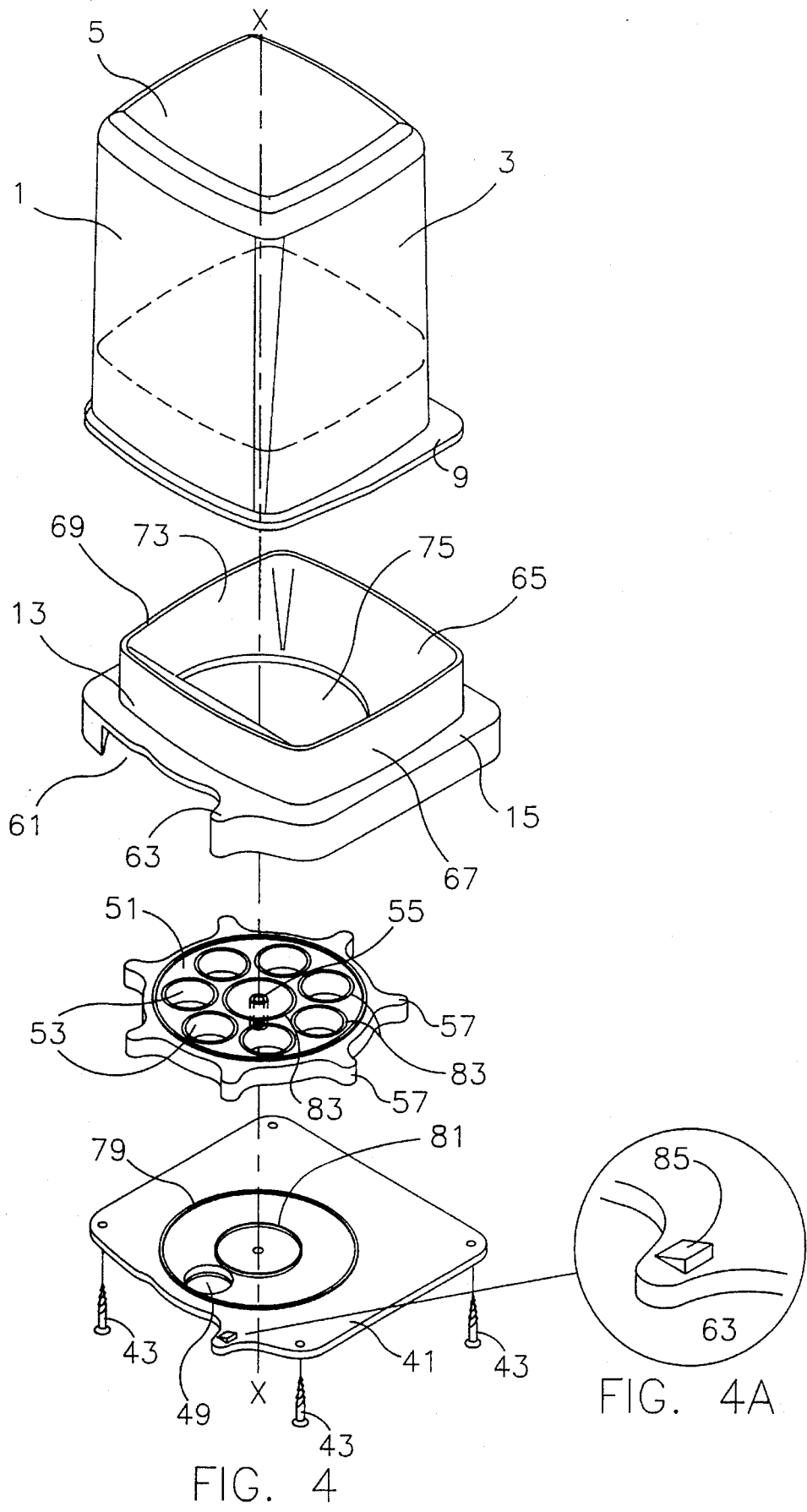
FIG. 4 is an exploded view of the preferred embodiment of this invention.

Turning now to the drawings wherein like elements are identified with like numerals throughout the 9 figures, FIGS. 1, 2 and 3 show how the novel dispenser of this invention may be arranged to be useful in a free-standing mode (FIG. 1), attached to an overhanging surface (FIG. 2) or attached to a vertical surface (FIG. 3). The details of the preferred embodiment are shown in FIG. 4 and show a granular material container 1, comprised of four contiguous container walls 3 and an enclosed contiguous bottom 5 having an open top 7 spaced apart from bottom 5. Open top 7 is surrounded by an extended flat surface 9 forming a flange. While said flange 9 may extend inwardly from contiguous container walls 3, it is preferred that it extends outward from open top 7 as shown in FIG. 1. Container 1 is preferably transparent so that one may observe the amount of granular material therein. Further, container 1 may have a rounded or other geometric cross-section, however, it is shown to be square in overall cross-section. Flange 9 is preferably made integral with said container, however, it is contemplated that said flange may be made as an add-on unit to a wide variety and design of containers. It is preferred that container 1 be injection molded of clear plastic so that the manufacturing costs thereof are minimized when made of large quantity.

Below container 1 in FIG. 4 is next shown a dispenser housing 13 that comprises a generally flat or planar unit arranged horizontally to the main axis X—X of said assembly. Dispenser housing 13 includes an upwardly-facing, flat, support surface 15, preferably encircling the outer perimeter thereof, and sized and arranged for receipt thereon of container flange 9 in sealing engagement therewith. In this configuration, container 1 is shown inverted so that the force of gravity pulls the granular contents in said container downward toward open top 7. To join these two structures together, housing 13 is inserted and placed over open container top 7 and then the two mated structures inverted to place container 1 above housing 13 as shown in FIGS. 1–4. Preferably, flange 9 is made narrow and defines the outer edge or rim of housing 13 to form an aesthetically appealing design.

Shown in FIGS. 1–3 is a support 17 comprised of a C-shaped, curved member 19 for sliding engagement over a portion of container flange 9 and dispensing support surface 15 for retaining them in sandwich-like sealing engagement. A unique aspect of support 17 is that container 1 and dispenser housing 13 may be merely slid into said C-shaped member 19 to join them together and hold them together during use of the dispenser and no other fasteners, such as clips, screws, bolts, springs and the like are required. It is particularly preferred to have dispenser housing 13 made in rectangular or square outline, as shown in FIGS. 1–4, and arranged C-shaped member 19 to extend around three sides of said housing to join and clasp flange 9 and support surface 15 together.

Extending from C-shaped section 19 is means 21 for maintaining dispenser housing 13 in either free-standing configuration or for mounting it on overhanging or vertical surfaces as aforesaid. Means 21 is shown in FIGS. 1 and 2 to include a support wall 25 extending normal to the plane of C-shaped member 19 and terminating at an attachment wall 27 extending normal to the plane of support wall 25 and preferably over C-shaped member 19. Attachment wall 27 forms at least 1, but preferably a pair of spaced-apart apertures 29 for receipt therethrough of fasteners (not shown) such as screws for attaching said dispenser to an overhead surface (not shown) as depicted in FIG. 2 or stabilizing said dispenser when in free-standing configuration (FIG. 1). In changing from FIG. 1 to FIG. 2, means 21 is just inverted. Support wall 25 is also shown to form at least one, but preferably a pair, of apertures 31 for receipt therethrough of other fasteners such as screw 33 to fasten the dispenser to a vertical wall (not shown).

As shown in FIGS. 4–6, a shallow chamber 37 is formed in housing 13 that opens downward and is bound by a descending perimeter wall 39 preferably extending downward from flange 9. Chamber 37 is preferably circular in overall design and preferably formed centrally in dispenser housing 13. Chamber 37 is covered over at the bottom of perimeter wall 39 by a flat cover plate 41 that is held by removable fasteners, such as screws 43, received in the corners 45 of housing 13. A drop hole 49 is formed in cover plate 41, preferably at the front of dispenser housing 13, that provides an opening from chamber 13 to below said housing.

A disk-shaped element 51 is positioned in chamber 37 and held for rotary motion therein by cover plate 41. A plurality of vertical disposed measuring and dispensing apertures 53 are formed in element 51 and arranged in a circular pattern about the rotative center 55 thereof. There is no mountable center point in disk-shaped element 51. The volume of granular material is determined by the thickness of element 51 and the size of apertures 53. The reason removable screws 43 or other fasteners are used in this invention is to be able to change one disk-shaped element 51 for another, having larger or smaller holes, as the case may be to dispense a different type or strength granular material from container 1.

A plurality of short levers 57 are attached to, or more preferably molded in disk-shaped element 51 and extend outward in regular spaced-apart arrangement to form, at the tips thereof, the outside perimeter of element 51. Short levers 57 are arranged to extend from disk-shape element 51 and rotate with disk apertures 53 in chamber 37. A slot 61 is formed in descending perimeter wall 39, preferably at the front of the dispenser, through which levers 57 pass in horizontal arcuate movement as disk element 51 is rotated in chamber 37. A small, first protuberance 63 is attached to or more preferably molded in dispenser housing 13, at one side of slot 61, preferably facing forward of the dispenser. The thumb and forefinger of the user are used to squeeze lever 57 toward protuberance 63 to rotate disk-shaped element 51 in chamber 37. Drop hole 49 is arranged to come into registration with one of apertures 53 as lever 57 is moved over top of protuberance 63. When said lever is not in registration with protuberance 63, apertures 53 are not registered with drop, hole 49.

A feeder 65 is formed integral with dispenser housing 13 and comprises an outer wall 67 extending upwardly from support surface 15, terminating at a rim 69 spaced above said support surface, to mate in juxtaposed sealing engagement with a portion of the inner surface of container walls 3 in a narrow band adjacent flange 9. A funnel-shaped inner wall 73 begins at rim 69 and slants downwardly and inwardly to form a D-shaped opening 75 vertically downward through dispenser housing 13 to direct granular material from interior container 1 on to the top of disk-shaped element 51 and into measuring and dispenser apertures 53. A portion of inner wall 73, preferably that portion representing the straight side of the letter "D" (of the D-shape) is arranged to cover over the front area of dispenser housing 13 and over dispenser apertures 53, as they are rotated by movement of levers 57 into registration with protuberance 63, to provide registration between one of apertures 53 and drop hole 49. More particularly, inner wall 73 terminates a few thousands of an inch above the top of disk-shaped element 51 to plan or scrape granular material piled above element 51 away from the upper surface thereof. This prevents an over-sized volume of granular material from dropping through drop hole 49 and into someone's cup or other container.

It is preferred that drop hole 49 be at least the same size as a measuring and dispensing aperture 53 so that all of the granular material will be dispensed. Said drop hole 49 may even be larger as long as it does not allow the contents of an adjacent dispensing aperture from spilling through the drop hole. A pair of circular seals 77 and 79 are concentrically arranged on the top surface of cover plate 41, centrally about disk element center 55, to insure against spillage or leakage of granular material from apertures 53. A like seal 81 is set on top of disk-shaped element 51 and separate seals 83 are set about each aperture 53 for the same purpose. The seals set about the perimeter of each of apertures 53 come into sliding contact with the lower edge of inner wall 73 to assist in plowing or scraping granular material away from above each aperture 53 to provide for accurate metering of quantities of granular material.

As shown in FIG. 4A, a second protuberance in the form of a small ramp 85 is formed on top of first protuberance 63 over which a lever 57 passes when a dispensing aperture 53 is brought into registration with drop hole 49. A like-shaped protuberance 87 (ramp) (see FIGS. 6 and 7) is formed in the underside of levers 57 and is designed to pass over ramp 85 when a lever 57 passes when a dispensing aperture 53 is brought into registration with drop hole 49. The passage of lever 57 and over ramp 85 and the slight springing action of ramp 85 makes the two intercontacting protuberance produce an audible noise, like a "click", indicating to the user that granular material has been dispensed through drop hole 49. In addition, while the two interacting ramps, 85 and 87, pass over each other in one direction, they cannot pass over each other in the opposite direction because the ramps will hang up on each other. This prevents the user from turning dis-shaped element in the opposite direction.

As shown in FIG. 5A, in another embodiment, feeder outer wall 67 is made to fit into juxtaposed, sealing relationship with the inside surface of container wall 3 in an inset area 89 to provide a better seal against escape of granular material.

Figure 7:
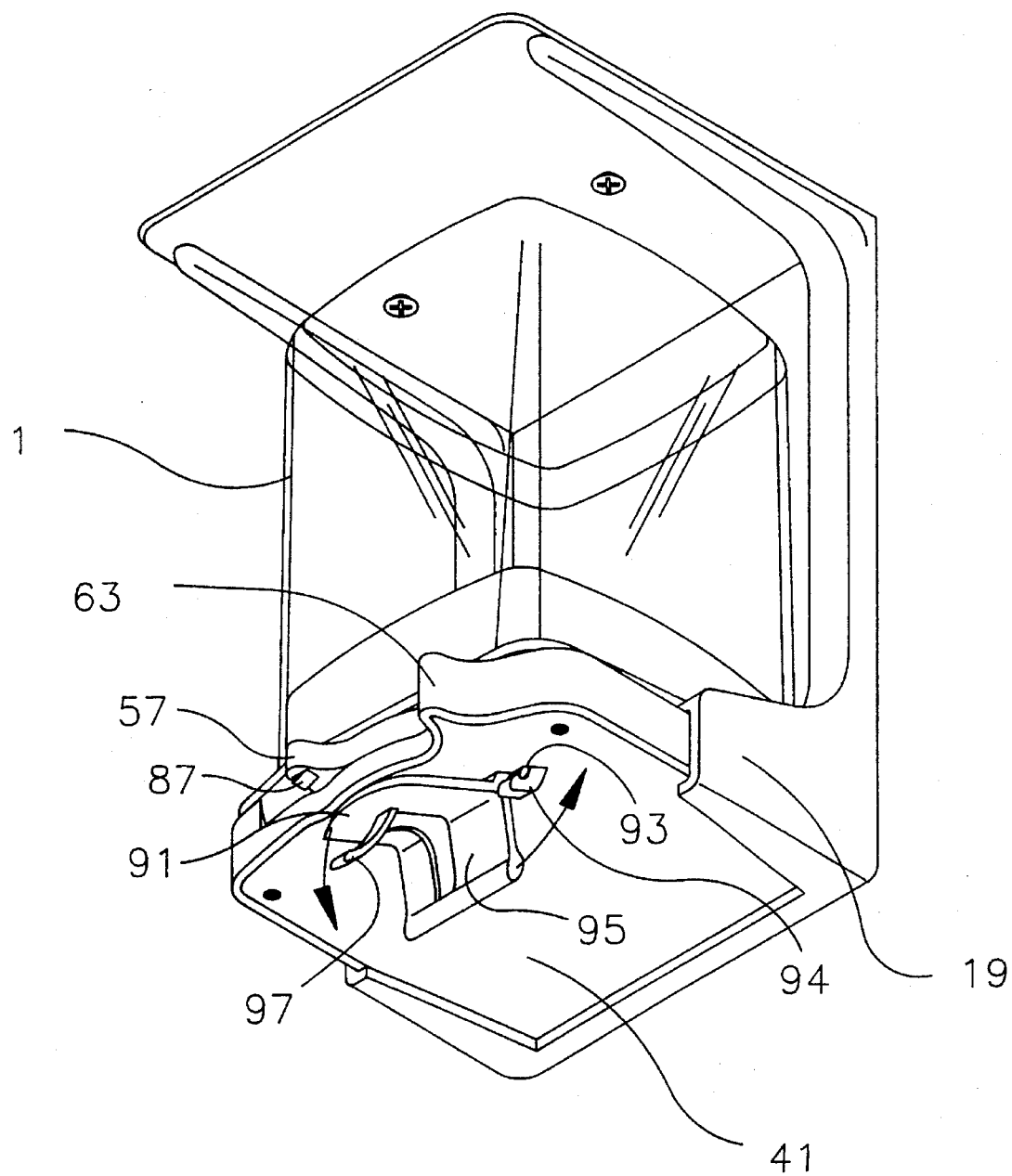

As shown in FIG. 7, a cover door 91 is pivotally mounted by pins 93 from a pair of spaced apart hangers 94 that extend from under cover plate 41 and said door 91 is arranged to cover drop hole 49 when no cup or other container is positioned thereunder. An offset weight 95 is attached to said cover door to urge it into closed position against the underside of drop hole 49. A trigger 97 is made to descend from cover door 91, spaced apart from weight 95, to swing or pivot cover door 91 inwardly and out of the way under pressure from a cup or other container moved horizontally into position under drop hole 49.

All of the parts used in this invention are designed to be injection molded from strong plastic for low fabrication costs and rugged design and use. They may be easily dissembled for cleaning and replacement of element 51 with another element and reassembled.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the way to achieve substantially the same result are within the scope of this invention.

What is claimed is:

1. A metered serving dispenser of cup-strength quantities of granular material comprising:

a) a granular material container comprising contiguous container walls and having a large, open end surrounded by an outwardly extending flat surface forming a flange;

b) a horizontally arranged dispenser housing including an upwardly-facing flat, support surface, for receipt of said container flange in sealing engagement therewith;

c) a support, including a C-shaped, curved member, for sliding engagement over a portion of said container flange and dispenser housing support surface, when in mutual sealed engagement, for retaining them in sandwich-like sealed engagement, and further including means extending from said curved member for mounting said dispenser in either a free-standing configuration, or under an overhanging surface, or against a vertical surface;

d) said housing having formed therein a shallow chamber bounded by a descending perimeter wall and a chamber closure plate mounted to said housing, below said chamber, said plate having a drop hole formed therein, opening from said chamber to below said housing;

e) a disk-shaped element removably retained in said chamber, for rotative movement therein, and having a plurality of vertically disposed measuring and dispensing apertures formed therethrough and arranged in a circle concentric with said element;

f) a plurality of short levers extending outward from said disk-shaped element into said chamber for manipulation, one at a time, through a slot formed in said descending perimeter wall, for advancing one of said measuring and dispensing apertures into registration with said drop hole; and, g) a feeder extending upward centrally from said housing, comprising:

i) an upwardly extending outer wall terminating at a rim spaced above said housing, said wall arranged to mate in sealing contact with the inner surface of said container adjacent said flange; and, ii) a funnel-shaped inner wall, slanting downwardly and inwardly from said rim to form an opening through said housing into said chamber, to direct the granular material from interior said container into said measuring and dispensing apertures in said disk-shaped element and wherein a portion of said inner wall extends over said measuring and dispensing element and terminates slightly above said element to level the granular material to the top of said dispensing aperture before said dispensing aperture is rotated into registration with said drop aperture.

2. The dispenser of claim 1 wherein said container is transparent.

3. The dispenser of claim 1 wherein said container has a substantially square cross-section.

4. The dispenser of claim 1 wherein said upwardly-facing flat support surface is narrow.

5. The dispenser of claim 1 wherein said upwardly-facing flat support surface is narrow and defines the outer edge of said housing.

6. The dispenser of claim 1 wherein said support means includes apertures formed in said extensions for use in fastening said housing to an overhanging surface or a vertical surface.

7. The dispenser of claim 1 wherein said horizontal housing is in rectangular shape and said C-shaped, curved member extends to three sides of said joined flange and supporting surfaces.

8. The dispenser of claim 1 wherein said horizontal housing is in square horizontal shape and said C-shaped, curved member extends to three sides of said joined flange and supporting surfaces.

9. The dispenser of claim 1 wherein said chamber is formed centrally in said housing.

10. The dispenser of claim 1 wherein said closure plate is mounted to said housing with removable fasteners.

11. The dispenser of claim 10 wherein said fasteners are screws.

12. The dispenser of claim 1 wherein said drop hole is not smaller than said measuring and dispensing aperture.

13. The dispenser of claim 1 wherein said drop hole is the same size as said measuring and dispensing aperture.

14. The dispenser of claim 1 wherein said drop hole is located at the front of said housing.

15. The dispenser of claim 1 further including circular seals between said closure plate and said disk-shaped element to prevent escape of granular material from said housing.

16. The dispenser of claim 1 further including circular seals mounted to said disk-shaped element to prevent escape of granular material from said housing.

17. The dispenser of claim 1 further including a first protuberance extending from the front of said housing, adjacent said slot, for aid in manipulating said levers across said slot during dispensing of said granular material.

18. The dispenser of claim 17 further including a second, ramp-shaped protuberance formed on said first protuberance for temporary engagement by a like ramp-shaped protuberance formed on the mating surfaces of said levers during the dispensing operation to provide an audible "click" indicating the dispensing operation has been completed and prevent reverse rotation of said disk.

19. The dispenser of claim 1 wherein said outer wall engages an inset formed in said container wall adjacent said flange to increase the sealing between said feeder and said container.

20. The dispenser of claim 1 further including:

a) a cover door pivotally mounted under said cover plate for closing over said drop hole;

b) an offset weight attached to said cover door to urge said cover door into closed position against the underside of said drop hole; and, c) a downwardly angled trigger attached to said cover door, spaced apart from said offset weight, to pivot said cover door downward and away from said drop hole by horizontal movement of a cup or other container thereagainst.

* * * * *